US007840681B2

(12) United States Patent
Acharya et al.

(10) Patent No.: US 7,840,681 B2
(45) Date of Patent: Nov. 23, 2010

(54) METHOD AND APPARATUS FOR INTEGRATING WEARABLE DEVICES WITHIN A SIP INFRASTRUCTURE

(75) Inventors: Arup Acharya, Nanuet, NY (US);
Stefan Berger, New York, NY (US);
Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/903,145

(22) Filed: Jul. 30, 2004

(65) Prior Publication Data

US 2006/0026288 A1    Feb. 2, 2006

(51) Int. Cl.
*G06F 15/16* (2006.01)
(52) U.S. Cl. .................... 709/227; 709/204; 709/228
(58) Field of Classification Search ......... 709/204–206, 709/227–229
See application file for complete search history.

(56) References Cited

U.S. PATENT DOCUMENTS

| | | | | | |
|---|---|---|---|---|---|
| 6,625,141 | B1 * | 9/2003 | Glitho et al. | ................. | 370/352 |
| 6,681,252 | B1 * | 1/2004 | Schuster et al. | ............. | 709/227 |
| 6,757,732 | B1 * | 6/2004 | Sollee et al. | ................ | 709/227 |
| 6,862,277 | B2 * | 3/2005 | Pan et al. | .................... | 370/352 |
| 6,985,961 | B1 * | 1/2006 | Ramsayer et al. | ........... | 709/238 |
| 6,996,605 | B2 * | 2/2006 | Low et al. | ................... | 709/204 |
| 2002/0095465 | A1 * | 7/2002 | Banks et al. | ................ | 709/206 |
| 2002/0143874 | A1 * | 10/2002 | Marquette et al. | ........... | 709/204 |
| 2003/0145054 | A1 * | 7/2003 | Dyke | ......................... | 709/205 |
| 2004/0163127 | A1 * | 8/2004 | Karaoguz et al. | ........... | 725/120 |
| 2004/0246951 | A1 * | 12/2004 | Parker et al. | ............... | 370/356 |
| 2005/0283480 | A1 * | 12/2005 | Berglund et al. | ............. | 707/10 |

OTHER PUBLICATIONS

B. Campbell et al. The Message Session Relay Protocol. SIMPLE Working Group Internet-Draft, Jan. 2004.
B. Campbell, editor. Session Initiation Protocol (SIP) Extension for Instant Messaging. RFC 3428.IETF, Dec. 2002.
Handley, M. and V. Jacobson, SDP: Session Description Protocol, RFC 2327, IETF Apr. 1998.
W. Jiang, J. Lennox, H. Schulzrinne and K. Singh. Towards Junking the PBX: Deploying IP Telephony. NOSSDAV 2001, pp. 177-185.
N. Kamijoh, T. Inoue, C. M. Olsen, M. T. Raghunath, C. Narayanaswami, *Energy trade-offs in the IBM Wristwatch computer.* IEEE International Symposium on Wearable Computing, ISWC 2001, pp. 133-140.

(Continued)

*Primary Examiner*—William C Vaughn, Jr.
*Assistant Examiner*—Mohamed Ibrahim
(74) *Attorney, Agent, or Firm*—George Willinghan; August Law, LLC

(57) ABSTRACT

The present invention is directed to a session initiation protocol (SIP) infrastructure containing various user devices and the use of this infrastructure to conduct media exchange sessions among the various user devices. Included in the user devices are wearable devices, for example pendants and wrist watches, that provide readily available and accessible devices for use in controlling the media exchange sessions. SIP permits the separation of the control aspects of a session from the actual media exchange aspects to facilitate the use of wearable devices having limited processing resources as control devices. The actual media exchange is directed to user devices suitable for sending, receiving and displaying the exchanged media.

18 Claims, 9 Drawing Sheets

OTHER PUBLICATIONS

C. Pinhanez, The Everywhere Displays Projector: A Device to Create Ubiquitous Graphical Interfaces, Proc. of Ubiquitous Computing 2001 (Ubicomp''01), Atlanta, Georgia, Sep. 2001, pp. 315-331.

C. Narayanaswami et al., IBM's Linux Watch: The Challenge of Miniaturization. IEEE Computer, vol. 35, pp. 33-41, Jan. 2002.

A. Niemi et al., Session Initiation Protocol (SIP) Extension for Presence Publication. SIMPLE Working Group Internet-Draft, Jun. 2003.

M. T. Raghunath, C. Narayanaswami, User Interfaces for Applications on a Wrist Watch, Journal of Personal and Ubiquitous Computing, (2002) 6:17-30.

H. Schulzrinne et al. RTP: A Transport Protocol for Real-Time Applications. RFC 1889.IETF, Jan. 1996.

J. Rosenberg et al. SIP: Session Initiation Protocol. RFC 3261. IETF, Jun. 2002.

J. Rosenberg, G. Camarillo. Examples of Network Address Translation (NAT) and Firewall Traversal for the Session Initiation Protocol (SIP), Internet Draft, Dec. 2003.

H. Sugano et al. Presence Information Data Format, draft-ietf-impp-cpim-pidf-08.txt. Internet Draft, IETF May 2003.

A. Vemuri and J. Peterson. Session Initiation Protocol for Telephones (SIP-T): Context and Architectures. RFC 3372, IETF Sep. 2002.

* cited by examiner

METHOD AND APPARATUS FOR INTEGRATING WEARABLE DEVICES WITHIN A SIP INFRASTRUCTURE

FIELD OF THE INVENTION

The present invention is directed to session initiation protocol in distributed networked systems.

BACKGROUND OF THE INVENTION

The deployment of Session Initiation Protocol (SIP) in enterprise networks gives users significantly greater flexibility to use and control commonly used communication technologies. SIP is an application-layer control or signaling protocol used for creating, modifying and terminating sessions that contain one or more participants. These sessions include Internet telephone calls, for example Voice over Internet Protocol (VoIP), voice calls, video calls, multimedia distribution, multimedia conferences, Instant Messaging (IM) and presence detection. An example of the use of SIP for presence detection is found in A. Niemi et al., *Session Initiation Protocol (SIP) Extension for Presence Publication*, SIMPLE Working Group Internet-Draft, June 2003.

The application of SIP can be for point-to-point or multi-party sessions. SIP invitations used to create sessions carry session descriptions that allow participants to agree on a set of compatible media types. SIP makes use of elements called proxy servers to help route requests to each user's current location, authenticate and authorize users for services, implement provider call-routing policies, and provide features to users. SIP also provides a registration function that allows users to upload their current locations for use by proxy servers. A description of SIP can be found in J. Rosenberg et al., SIP: *Session Initiation Protocol*, RFC 3261, IETF, June 2002.

In general, SIP runs on top of different transport protocols and is independent of the media transport, which, for example, typically uses Real-Time Transport Protocol (RTP) over User Datagram Protocol (UDP). An example of RTP can be found in H. Schulzrinne et al., *RTP: A Transport Protocol for Real-Time Applications*, RFC 1889, IETF, January 1996. SIP allows multiple end-points to establish media sessions with each other by supporting locating the end-points, establishing the session and then, after the media session has been completed, terminating the session. Recently, SIP has gained widespread acceptance and deployment among wireline service providers for introducing new services such as VoIP, within the enterprise for Instant Messaging and collaboration, and for push-to-talk service amongst mobile carriers.

SUMMARY OF THE INVENTION

The present invention is directed to a system and method for conducting media exchange sessions across a network infrastructure between two or more users. The present invention utilizes portable control devices, for example wrist watches, having a sufficient amount of processing power, to control, establish, modify and to a limited extent, participate in the media exchange sessions. The portable control devices utilize session initiation protocol (SIP) to control the media exchange session.

The present invention utilizes SIP to separate the control and media portions of a communication session. The control and media portions can be handled independently by a single device or can be handled separately by two different devices. Therefore, SIP facilitates a level of indirection and late binding of the device handling the media exchange portion. This is a powerful concept and has the potential to do for communications what pointers did for programming by separating data from addresses and virtual memory did for large programs by creating virtual addresses to overcome limits of real addresses.

Since the ability to exercise control places very few requirements on the end devices used for control, it is possible to make portable devices with a TCP/IP stack part of the SIP infrastructure. Portable control devices having integrated processors are ideally suited for establishing media exchange sessions because of their easy accessibility and their ability to reliably get the user's attention under a variety of conditions. Portable control devices also contain information that can be used to personalize and improve the user experience. End-user devices that have fewer constraints in terms of processor capacity, graphics capabilities, storage and networking are better suited to participate in the media exchange portion of the media exchange session.

In one embodiment for conducting a media exchange session in accordance with the present invention, a portable control device located proximate a first user is identified and used to control the media exchange session, preferably using SIP. This portable control device can be a personal digital assistant, a cellular phone or a wearable portable control device such as a watch, a pendant, a bracelet, a badge, a necklace, a ring, an armband or eye glasses. In order to control the media exchange session, a first media device capable of sending, receiving and displaying the exchanged media and located proximate the first user is identified, and a second media device that is also capable of sending, receiving and displaying the exchanged media but is located proximate the second user is identified. Having identified the two media devices, a media exchange path is established between the first media device and the second media device.

In order to transfer the media exchange path between media devices using the portable control device, control of the media exchange session is maintained with the portable control device, and an alternate media device capable of sending, receiving and displaying the exchanged media and located proximate the first user is identified. The portable control device then transfers the media exchange path from the first media device and the alternate media device. If the portable control device does not already have control of the media exchange session, then control over the media exchange session by the portable control device is first established. Transfer of the media path can be necessitated by a desire to transfer the session to a portable media device.

In addition to initiating a media exchange session, the portable control device can be used to join or subscribe to a media exchange session, for example in response to receiving an invitation on the portable control device from a second user to join the media exchange session. In response to this invitation, the portable control device processes the invitation, for example by selecting one of a plurality of pre-defined action items stored and displayed on the portable control device. The pre-defined actions include, but are not limited to, selecting a device proximate the first user to participate in the media exchange session, holding the invitation for a specified period of time and transferring the invitation to another device.

The portable control device can be used to control video sessions, audio sessions, gaming session and text session including interactive text messaging systems such as Instant Messaging (IM). When the media exchange session involves an interactive text messaging exchange and the step of processing the invitation includes selecting a pre-defined action for joining the interactive text messaging exchange and using the portable control device as a first media device to exchange text messages. The text messages are exchanged between the first media device and a second media device located proximate the second user.

The present invention is also directed to a system for use in conducting media exchange sessions between a first user and one or more second users. The system includes a portable control device disposed at the first user and capable of controlling the media exchange session, a first media device disposed proximate the first user and capable of sending, receiving and displaying media exchanged during the media exchange session, a second media device disposed proximate the second user and capable of sending, receiving and displaying the media exchanged during the media exchange session and at least one proxy server in communication with the portable control device, the first media device and the second media device. The proxy server is capable of facilitating control of the media exchange session for example using SIP.

DETAILED DESCRIPTION

Figure 1:
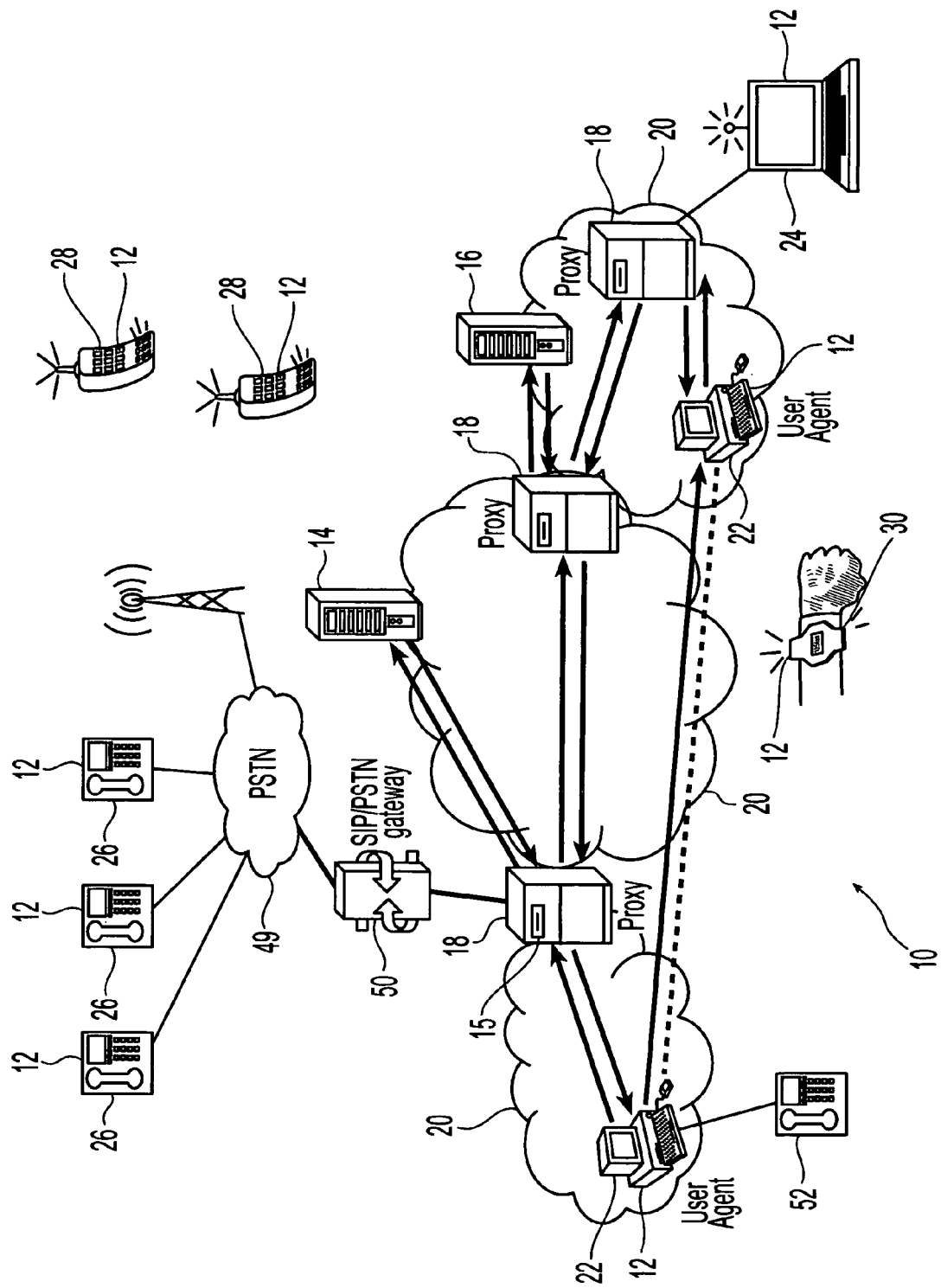
FIG. 1 is a schematic representation of a SIP infrastructure for use with a method in accordance with the present invention.

Referring initially to FIG. 1, a SIP infrastructure 10 for use with the present invention includes a plurality of user agents 12, one or more registration servers, one or more redirect servers 14, one or more location servers 16 and a plurality of SIP proxy servers 18 deployed across one or more networks 20. Each user agent 12 is associated with at least one user device. A user agent 12 is a SIP endpoint that controls either session setup or media transfer or both session setup and media transfer for the given user device with which it is associated. Examples of suitable user devices include, but are not limited to, mainframe computers, desktop personal computers 22, laptop personal computers 24, wireline phones including audio and video phones 26, video game controllers and small portable devices 30. Examples of small portable devices 30 include, but are not limited to, wireless or cellular phones 28, personal digital assistants (PDA's) and wearable devices that are provided with the desired amount of processing power and are typically worn or carried by the user and are easily and readably accessible. Examples of wearable devices include, but are not limited to, pendants, watches such as wrist watches, bracelets, badges, necklaces, rings, armbands and eye glasses. Wrist watches are the preferred portable or wearable device 30 in particular because of the large number of users that wear them on a regular basis and their readily accessible nature. An example of a wrist watch for use with the present invention is the IBM Linux WatchPad®, which is commercially available from IBM Corp. of Armonk, N.Y. A description of the WatchPad® can be found in C. Narayanaswami et al., *IBM's Linux Watch: The Challenge of Miniaturization*, IEEE Computer, Vol. 35, pp 33-41, January 2002, which is incorporated herein by reference in its entirety. In one embodiment, the WatchPad® contains 8 MB of dynamic RAM for execution of programs and 16 MB of flash memory. The WatchPad® uses an ARM7 microprocessor that can run at speeds between 18 and 74 MHz. The watch has a 320×240 monochrome LCD display and a Bluetooth interface that gives it access to the Internet using TCP/IP. Further, it has a touch-screen, three buttons on the front, a stem switch, a built-in beeper and vibrator to attract a user's attention, and a fingerprint sensor for user authentication.

User agents 12 within the SIP infrastructure 10 are identified by SIP Uniform Resource Identifiers (URI's), which are unique Hypertext Transfer Protocol (HTTP) URI's, for example of the form sip:user@domain. In order to generate these SIP URI's, the user agents 12 register their Internet Protocol (IP) addresses with a SIP registrar server 15, for example by using the SIP command "REGISTER". In one embodiment, the registration server 15 is a separate independent and stand-alone server. In another embodiment as illustrated in FIG. 1, the registration server 15 is co-located with a SIP proxy server 18. Following registration of the IP address, the IP address is mapped to the unique URI. The mapping of a URI to the IP address of a device registered by the user is done using intermediate SIP proxy servers 18, location servers 16 and redirect servers 14 as part of the media exchange session setup process.

In addition to facilitating media exchange communication sessions in accordance with the present invention, one or more or the servers contained within the SIP infrastructure can include a computer readable medium containing the computer readable code which when executed will perform a method for media exchange and media exchange session control in accordance with the present invention.

In one embodiment, a method for conducting a media exchange session between a first user and one or more second users in accordance with the present invention uses an easily accessible control device to establish and control the media exchange session without participating in the actual media exchange. A media exchange or communication session involves the exchange of audio, video, text or combinations of audio, video and text media between two or more users across one or more networks. The control device is selected based upon its ease of access by a user and reliability for notifying a user about an invitation to join a media exchange session. In one embodiment the control device is a portable control device 30. Preferably, the portable control device 30 is a wearable device. In order to conduct the media exchange session, a portable control device is selected that is worn by a first user. This portable device 30 controls the media exchange session including controlling the initiation and setup of the media exchange session. The preferred control protocol for use in controlling and conducting the media exchange session is SIP.

Controlling the media exchange session using the portable device 30 includes establishing a new media exchange session, modifying an existing media exchange session, responding to an invitation to join or to establish a media exchange session and participating in the media exchange session. In order to establish a media exchange session, the portable device 30 is used to identify a first media device located proximate the first user that is capable sending, receiving and displaying the type of media to be exchanged. The portable device 30 also identifies a second media device located proximate the second user that is also capable of sending, receiving and displaying the exchanged media. Once the first and second media devices, or end-points, have been identified, a media exchange path is established between the first media device and the second media device and the media exchange session commences.

In one embodiment, after the media exchange path is established, the portable device 30 relinquishes control of the media exchange session. In another embodiment, the portable device 30 maintains control of the media exchange session so that modifications can be made as desired during the session. For example, the media path can be transferred from either the first or second user device to an alternate end-user device. In order to transfer the media path, an alternate media device is identified, for example proximate the first user. The alternate media device is also capable of sending, receiving and displaying the media exchanged during the media exchange session. Once identified, the media exchange path is transferred or moved from the first media device and the alternate media device. Such a move can be necessitated by the need of the first user to change from a stationary media exchange platform to a mobile platform. Therefore, the alternative media device is selected to be a portable media device. If the portable device 30 does not maintain control of the media exchange session, then it must first join or obtain control of the media exchange session before making the desired modifications.

In addition to being an initiator of the media exchange sessions, the portable device 30 can join a media exchange session either on its own initiative, through a subscription type service or in response to an invitation to join received from a second user. In one embodiment, the portable device 30 receives an invitation to join a media exchange session. Upon receipt of the invitation, the portable device 30 determines how to process and respond to the invitation. Suitable responses include joining the session or declining to join the session. In order to facilitate this determination, the request can be processed by selecting a pre-defined action item stored and displayed on the portable control device.

In an embodiment when the media exchange session is an interactive text messaging exchange, for example Instant Messaging (IM), the portable device 30 is capable of actually participating in the media exchange of text messaging. Typically, the portable device 30 participates in the text messaging exchange in a relatively constrained capacity. In one embodiment, to accept the invitation to participate, the portable device 30 selects, from a list containing a plurality of pre-defined actions, the action for joining the interactive text messaging exchange. The portable control device identifies itself as the first media device and exchanges text messages between itself and the second media device, which is located proximate the second user. Various embodiments of the method in accordance with the present invention are described below.

Figure 2:
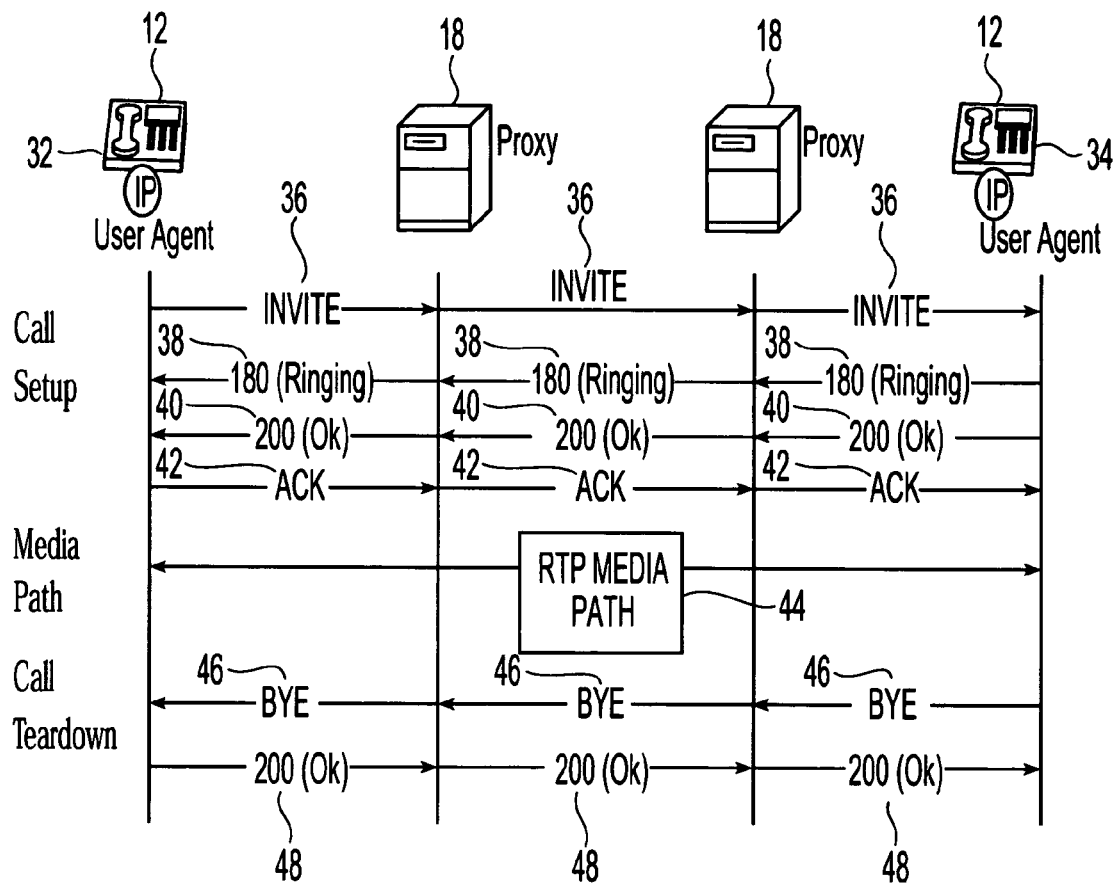
FIG. 2 is a chart illustrating an embodiment of a method for initiating a voice communication session in accordance with the present invention.

An embodiment of a session setup process is illustrated in FIG. 2. SIP defines a set of messages, for example "INVITE" and "REFER", to setup sessions between a first user agent 32 and a second user agent 34 to join a media exchange or communication session. As illustrated, the first and second user agents are communicating using VoIP phones. The messages are routed through a series of SIP proxy servers 18 that are distributed throughout the network 20. Domain Name System (DNS) Service (SRV) records assist in finding SIP proxy servers 18 responsible for the destination domain of sent messages.

In order to set-up or establish a VoIP call, the first user agent 32 originates a request to the second user agent 34, using for example the SIP "INVITE" command 36. This request from the first user agent 32 is routed through the series of SIP proxy servers 18 using a destination SIP URI included in the request from the first user agent 32. If necessary, the SIP proxy servers 18 can query location servers 16 and redirect servers 14 to determine the current bindings of the destination SIP URI. Signaling messages are exchanged between user agents 12, proxy servers 18, redirect servers 14 and location servers 16 to locate the appropriate endpoints for media exchange. For reasons of scalability, multiple proxy servers 18 are used to distribute the signaling load as described, for example, in W. Jiang, J. Lennox, H. Schulzrinne and K. Singh, *Towards Junking the PBX: Deploying IP Telephony*, NOSSDAV 2001, pp 177-185, which is incorporated herein by reference in its entirety.

After the first user agent 32 sends an INVITE to the second user agent 34, the first user agent 32 receives an audible ringing 38, which is processed through the proxy servers 18, and a response from the second user agent 34, for example using the SIP "OK" command 40. The first user agent 32 then acknowledges the response, using, for example, the SIP "ACK" command 42, and the session, in this case a VoIP phone call, between the two user agents is set-up. The necessary media for the session is exchanged between the two parties using an RTP media path 44. In order to terminate or "teardown" the session, a termination message is exchanged between the two user agents. For example, the SIP "BYE" command 46 is sent from the second user agent 34 to the first user agent 32, and the first user agent 32 responds with an OK message 48.

Although illustrated between two VoIP telephones, voice sessions can also be established between VoIP phones and telephones that are a part of the public switched telephone network (PSTN) 49 (FIG. 1) including wireline and cellular phones. An interoperability function allows calls to be made between a PSTN phone and a SIP or VoIP phone. A definition of a suitable interoperability function can be found in A. Vemuri and J. Peterson, *Session Initiation Protocol for Telephones (SIP-T): Context and Architectures*, RFC 3372, IETF September 2002, which is incorporated herein by reference in its entirety. A SIP/PSTN gateway is responsible for converting between SIP and PSTN signaling on the control path as well as media conversion between circuit-switched voice in the PSTN network and packet voice in the SIP/IP network. A SIP device can be addressed from a PSTN phone by assigning a PSTN number to the SIP device and setting up appropriate call routing entries at the SIP/PSTN gateway 50 (FIG. 1). Similarly, a PSTN number can be easily mapped to a corresponding SIP URI and thus a PSTN device can be addressed by a SIP device as well.

Besides interoperability, there are some known issues with respect to firewall traversal when SIP signaling and associated media cross domain boundaries. However, multiple solutions have been put forward to address the issue. Examples of these solutions can be found in J. Rosenberg, G. Camarillo, *Examples of Network Address Translation (NAT) and Firewall Traversal for the Session Initiation Protocol (SIP)*, Internet Draft (work in progress), December 2003, which is incorporated herein by reference in its entirety.

A basic tenet of SIP is the separation of signaling and control, for example setup and termination, of a session from the actual exchange of media. Therefore, SIP distinguishes between the process of session establishment and the actual session. Signaling messages are typically routed through the proxy servers, while the media path is end-to-end. Session setup messages, for example INVITE, contain user parameters that utilize Session Description Protocol (SDP) in the message body. A description of SDP can be found in Handley, M. and V. Jacobson, *SDP: Session Description Protocol*, RFC 2327, IETF April 1998.

In general, SDP provides information about the session including parameters for media type, transport protocol, IP addresses and the port numbers of endpoints. The IP address and port numbers exchanged through SDP are used for the actual data transmission or media path of the media exchange session. These parameters can be exchanged during the establishment of a session, for example using INVITE, or during an ongoing session using, for example, the SIP "RE-INVITE" message. RE-INVITE is generally identical to the INVITE message except that it can occur within an existing session. In addition, a user agent can transfer an existing session to a third end-point device or user agent using transfer commands such as, for example, the SIP "REFER" message. The REFER message instructs the other existing end-point device or user agent of the current session to initiate an INVITE/OK/ACK exchange with the third user agent and to terminate the current session, that is the session with the user agent that sent the REFER message.

In addition to initiating and terminating sessions, user agents can subscribe to published sessions hosted by a user agent and can be notified whenever a published session is initiated. SIP for Instant Messaging and Presence Leveraging Extensions (SIMPLE) supports SIP "SUBSCRIBE" and "NOTIFY" mechanisms for subscribing to session. A description of SIMPLE can be found in A. Niemi et al., *Session Initiation Protocol (SIP)Extension for Presence Publication*, SIMPLE Working Group Internet-Draft, June 2003, which is incorporated herein by reference in its entirety. SIMPLE also provides support for IM through the introduction of a new message or command, the SIP "MESSAGE" command. In addition, Message Session Relay Protocol (MSRP) is an alternate method for IM that, unlike SIMPLE, is session-based. A description of MSRP is given in B. Campbell et al., *The Message Session Relay Protocol*, SIMPLE Working Group Internet-Draft, January 2004, which is incorporated herein by reference in its entirety.

The separation of SIP signaling or control from media exchange facilitates the use of separate devices or user agents for session initiation and session participation. In particular, these devices can be located at geographically distinct locations, providing for the remote establishment of sessions. In addition, user agents are allocated between either session control or media exchange based upon the resources available in the user devices associated with each user agent. Therefore, user devices with limited data processing or storage capacity but with easy accessibility are allocated to session control, and user devices with significant and available processing and storage resources are allocated to media exchange. Therefore, the use of SIP facilitates the use of small portable control devices having constrained power or resources such as watches, pendants, bracelets, necklaces, rings, armbands, eye glasses, cellular phones and personal digital assistants.

Portable personal devices, for example the WatchPad®, have two significant advantages over non-portable devices and other, larger portable devices. First, a portable device 30 is always available, offering a familiar, known interface to the user and containing the user's personal information, e.g., calendar and address book. In contrast a stationary phone, say in a conference room, may only offer a key-pad to dial out a number and contain no personalized information. A portable device is less obtrusive and has a lower user response time to react to incoming calls or messages. Second, portable devices are very reliable for getting the user's attention to an incoming request by using audio or tactile means to alert the user. The portable device 30 can be used in two modes, as a first-class control device in the SIP network or as a front-end to other devices such as a cell-phone or a PDA. For example, a watch screen can act as a proxy for the cell-phone or PDA's user interface.

Although portable devices support the transfer of media, these devices typically have limited battery power and lower signal quality compared to stationary and wired devices. Therefore, the role of portable devices for media exchange is limited, but these devices are suited for session control and management. The control part, which is less power, memory and processor intensive, is well suited for the portable device 30, while the media exchange components of the media exchange session are best handled by tethered devices commonly found within office or home environments. In accordance with present invention, a portable device 30 is used to initiate or subscribe to a session, and the actual media exchange of the session is accomplished through other devices that are located in the present vicinity of the session participants rather than through the portable device 30. The primary role of the portable device 30 is to setup a session with called parties and then transfer the media stream to one or more adjacent devices. In addition, the portable device 30 leverages user-specific information that is already stored in the device, i.e. address books, to establish and control the media exchange sessions.

Once a session is established, the small portable device moves the session to another device that is better equipped to handle the actual media transfer. Therefore, the portable device 30 initiates a media exchange session but does not handle the actual exchange of media. Because of the ability to interoperate between SIP and PSTN networks, a SIP-enabled portable control device can control not only SIP devices but also PSTN and cellular phones, which are widely available and utilized in both home and office environments.

Other devices in the SIP infrastructure are preferred for media input, media output and media display. These other devices have access to electrical power, more computing capacity, larger speakers, larger and brighter displays, and larger and more secure storage systems. The increased storage capacity of the other devices allows users to record the media portions of the session for later retrieval and search. The saved data can be linked to other applications such as E-mail and voicemail systems. Higher quality audio output such as stereo and high fidelity systems including directed sound systems are available on some audio systems as are large steerable projectors that show the graphics or video. An example of a steerable projector display is the IBM EveryWhere Display, which is described in C. Pinhanez, *The Everywhere Displays Projector: A Device to Create Ubiquitous Graphical Interfaces*, Proc. of Ubiquitous Computing 2001 (Ubicomp"01), Atlanta, Ga., September 2001, pp 315-331. Moreover, the other devices typically utilize faster and cheaper network connections, allowing higher frame rates in graphics and video applications, and can play compressed media streams in real time. These other devices are often found in conference rooms and other public places where several people can gather to listen to or see the media. In addition, these other devices are able to encrypt and decrypt data strongly and offer a higher level of security.

Another advantage of using certain other devices for media exchange, for example stationary hard-wired devices, is the integration of these devices within a typical corporate infrastructure and within other applications. For example, a recorded conversation can be converted to text and distributed via an E-mail application. This would be much harder to do if the conversation was recorded on a mobile device. Similarly, a recorded video can be attached to centralized databases for later retrieval and review. In other cases, using translation technologies available on certain stationary devices, one party could use voice while the other uses text.

In a business environment, a variety of devices, including stationary devices, are available to handle the media exchange portion of the session. These devices are capable of handling media to different degrees. For example, a laptop computer can display video and play audio, while a phone can only handle audio streams. The just-in-time binding of the media device selected for the media exchange portion of a session, i.e. binding of the device occurs when the session is established, facilitates taking into account the location and situational context of the user. Therefore, devices that are available at the location of the user when the session is initiated are identified for media transfer. The user does not fill in preferences or policies prior to session initiation, because these preferences and policies may be invalid at the time the session is actually initiated.

In one embodiment, the portable device 30 has sufficient processing and storage capacity to supply any authentication information necessary to set up the media exchange session. In addition, the portable device 30 can negotiate the parameters that apply to the media exchange session. For example, the portable device 30 can define or restrict the type of media transferred during the media exchange session based upon the type of devices involved in the session. In an embodiment where a portable device having a display of limited size participates in an IM session, the size of IM's exchanged can be restricted to 100 characters, or icons such as emotion icons or "smileys" can be utilized. The portable device 30 can also log the time, duration, destination party, and other details for the session. This log can later be used to retrieve the media from servers storing that media.

In one embodiment, the portable device 30 is used as a companion device to more powerful end-user devices such as desktop computers, especially when the display on the desktop is busy. For example when a presentation is in progress or when the display is out of the user's visual field because the user has walked away from the computer, functions such as notification of incoming calls or IM's, including the identification of the party placing the call, can be forwarded to the portable device 30 and displayed. Because of limitations on the power and functionality of the portable device 30, the user responds to the incoming call using a limited set of pre-defined options or icons using the input mechanisms provided on the portable device 30. These pre-defined options vary with the context of the call and can be tailored to specific software applications.

Integrating a SIP-enabled portable device 30 as a control mechanism in a SIP infrastructure involves determining how to partition functionality of existing and new applications between the portable device 30 and other existing SIP devices, mapping control functionality onto the portable device 30 without exceeding the memory or processing capacity of the portable device 30, enhancing the overall user experience and creating user-friendly interaction mechanisms.

In one embodiment, the creation of simple and intuitive interaction mechanisms is accomplished through the use of self-explanatory graphical, auditory and tactile means. The vibration generating mechanism of the portable device 30, for example, can be programmed to generate different tactile patterns, i.e. waveforms, in order to signify different types of communications. For example a 4 second on and a 4 second off pattern indicates a voice call, and a 4 second on and a 2 second off pattern indicates IM. In addition, the amplitude of the vibrations are set to notify the recipient user either abruptly or subtly. Since portable devices, and in particular watches, do not have large display screens capable of displaying large amounts of information, a relatively simple graphical user interface (GUI) is utilized. The input and output capabilities of wearable devices are also constrained by the number of input devices provided in the portable device 30. These input devices include switches, for example watch stem switches, buttons and touch-screens containing selectable text and icons. The functionality of these input devices are enhanced by the use of pre-programmed menus that are accessed by the input devices.

In order to handle situations when the portable device 30 is unavailable, for example by being turned-off or experiencing an interruption in its connection to the network, an alternate device, for example a user agent associated with an alternate portable device 30 can be registered with the network using the same URI as the unavailable portable device 30 so that incoming session setup requests, calls or IM's are forwarded to the alternate device and are not missed. In order to avoid unexpected power failures in the portable device 30, the portable device 30 is preferably operated to conserve power. For example, to conserver power on the WatchPad® the external Bluetooth communication chip is turned off as often and for as long as possible, conserving more power than what would be possible using standard Bluetooth power saving modes. Other power optimizing procedures that can be applied in connection with the systems and methods of the present invention are discussed in N. Kamijoh, T. Inoue, C. M. Olsen, M. T. Raghunath and C. Narayanaswami, *Energy Trade-Offs in the IBM Wristwatch Computer*, IEEE International Symposium on Wearable Computing, ISWC 2001, pp 133-140, which is incorporated herein by reference in its entirety. As a result of power conservation steps and to provide for forwarding of session calls when a portable device 30 is unavailable, the SIP-enabled infrastructure and methods in accordance with the present invention preferably check for the network connectivity of the portable device 30 on a routine basis.

In order to function within the SIP infrastructure, each user device including the wearable user devices such as the WatchPad® is augmented with a SIP stack. When connectivity to the network is established or confirmed, SIP registration of all user agents, their associated user devices and any alternate devices is performed. In one embodiment, each user agent registers its own SIP URI with one of the SIP proxy servers. Once the user agents and devices are registered, calls and subscription requests can be sent through the network. Since the status and location of user agents and devices can change over time, regular registration updates can be performed. The frequency of the registration updates will vary and can be based upon the number and types of user agents and devices in the network. For example, networks containing a significant number of portable or wearable devices that have a likelihood or history of continuous or regular movements are updated more frequently. The frequency of updates can vary over time based upon the movement patterns or can be a set value, for example about ten minutes.

In the embodiment of a SIP infrastructure 10 as illustrated in FIG. 1, a laptop computer 24 is associated with a user agent 12 that serves as Bluetooth base-station and router into the network 18 for the portable device 30. In addition to SIP enabled devices, the infrastructure 10 includes PSTN devices such as wireline phones 26 and cellular phones 28. In one embodiment, one or more of the wireline phones 26 or cellular phones 28 are located in the vicinity of the portable control device 30. The PSTN wireline phones 26 interconnect with the SIP network 18 via the SIP/PBX gateway 50 that translates signaling and media between PSTN and SIP/VoIP. In other words, the PSTN devices can be addressed from the SIP infrastructure 10. For example, a PSTN phone having the number 123-456-1111 inside a company identified as talk.domain can be addressed as sip: 1234561111 @talk.domain.com within the SIP network. The same address mechanism can be used for a cellular phone 28 that unlike the PSTN phone is maintained not by a corporate information technology (IT) network but by an external mobile operator. However, the connectivity to the cellular phone 28 is still provided by the PSTN gateway 50. Therefore, the portable device 30 has access to and can exhibit control over computing platforms such as desktops 22, laptops 24, PDA's, SIP IP phones 52 and PSTN phones both landline 26 and cellular 28.

To enable SIP on the portable device 30, the portable device 30 includes a user agent library. In one embodiment, the user agent library includes the GNU OpenSIP (oSIP) library in combination with the user agent library from the LinPhone project, which is a SIP compatible webphone. Details and descriptions of GNU oSIP and LinPhone can be found at http://www.gnu.org/software/osip and http://www.linphone.org. The user agent library offers methods for registration of end-devices or user agents with the SIP proxy servers and provides the basic functionality for communication session establishment and tear down including SDP parameter negotiation for RTP audio and video exchange. In addition, the user agent library facilitates the dialog maintenance that is required by the SIP protocol. In general all desired functionality within the SIP infrastructure, including support for instant messaging, publication, subscription and presence detection, is contained within the user agent library.

Each portable device 30 is provided with a sufficient amount of SIP functionality to function or behave like any other user device or end-device in the SIP infrastructure 10. This functionality includes the ability to control a SIP function and the ability to support the input and output of media. Alternatively, the portable device 30 provides the control for a SIP session but does not support any media input or output. If necessary, the application shell of the portable device 30 can be enhanced, for example using a module that offers an interface for the user to establish voice calls or to receive an IM, in order to provide the desired level of functionality. The module handles interactions with the underlying SIP user agent and coordinates user inputs.

As with the other SIP devices in the SIP infrastructure 10, the portable device 30 registers with at least one SIP proxy server 18 using a SIP URI. In one embodiment, the SIP URI contains an embedded PSTN number, and the portable device 30 is addressable by any device, via SIP or PSTN. In addition, the portable device 30 is able to control the other devices by establishing SIP sessions, terminating SIP sessions, modifying existing sessions, participating in SIP sessions such as IM sessions and redirecting VoIP media sessions to user-selected devices.

In one embodiment, the portable device 30 is used to control a voice communication session. In this embodiment, the portable device 30 does not serve as the source or destination of the VoIP media, i.e. the RTP packets. Instead, the portable device 30 initiates and establishes the voice communication session and orchestrates the flow of RTP media packets between the desired user devices, for example two phones. The two user devices are selected to be in the vicinity of the parties that are participating in the voice communication session. When the user having the portable device 30 is also a participant in the session, one phone is selected that is in that user's vicinity, and the other phone is selected to be in the vicinity of the party to be called.

The numbers or IP addresses associated with these phones can be contained in an electronic address book that is stored in the portable device 30, facilitating the use of the portable device 30 to initiate the voice communication session. In order to initiate the session, the party to be contacted is selected from the portable device address book. In addition, the initiating user selects a device in its own vicinity. In one embodiment, the initiating user's device is also selected from a list stored on the portable device 30. This list could either be a static list that is stored on the portable device 30 that contains a list of devices that are typically within the vicinity of the initiating user. Alternatively, the list could be determined dynamically using known service discovery mechanisms that identify devices that are currently within the vicinity of the initiating user, i.e. within the vicinity of the portable device 30.

Figure 3:
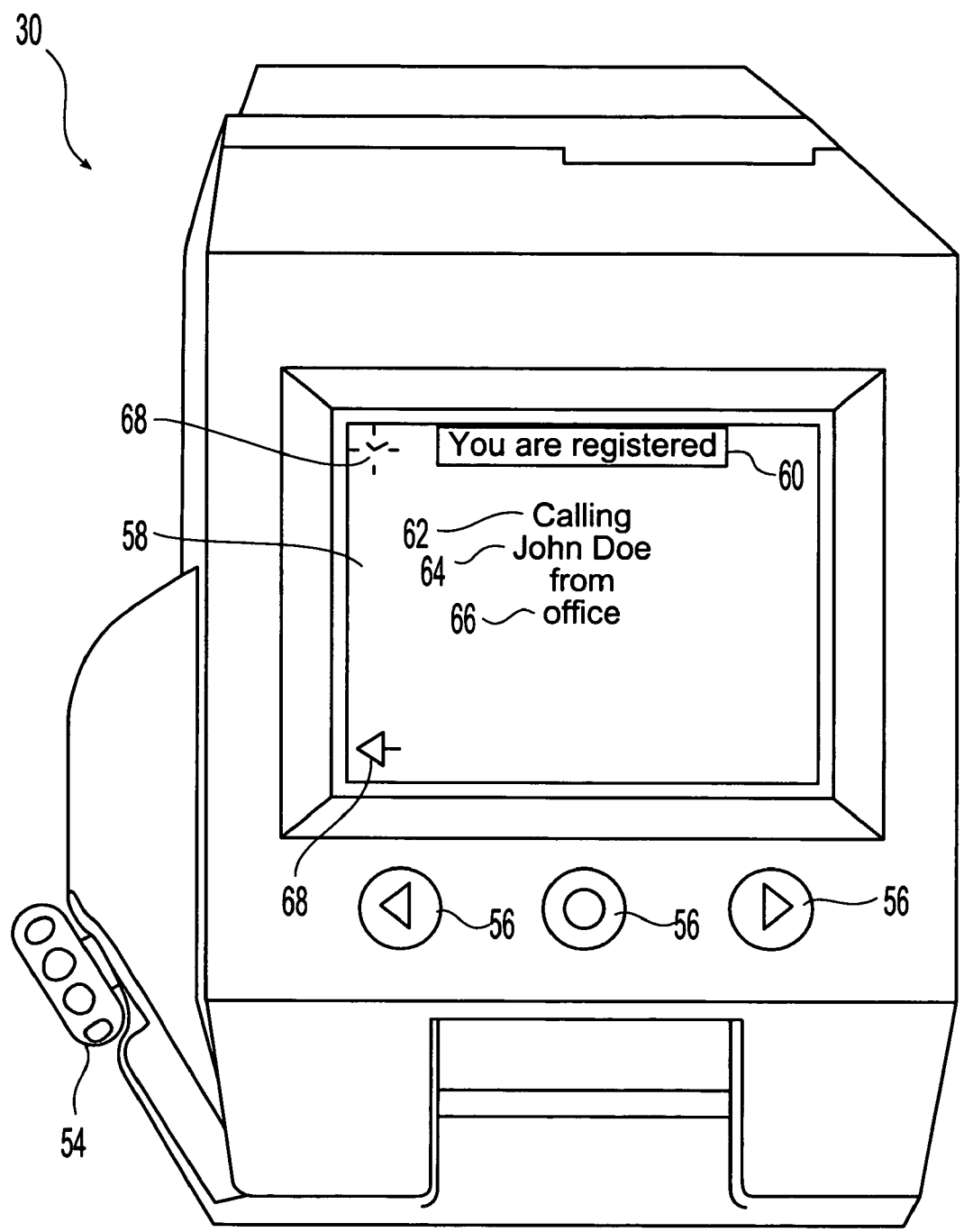
FIG. 3 is a plan view of a portable control device illustrating the initiation of a voice communication session.

An embodiment of a portable device 30 during call initiation is illustrated in FIG. 3. In the embodiment as illustrated, the portable device 30 is a WatchPad®. As illustrated, the portable device 30 includes a plurality of input devices including a watch stem switch 54, a plurality of input buttons 56 and a touch-screen 58. In addition to being an input device, the touch screen 58 displays information necessary to establish and control the communication session. This information includes a status line 60 showing the current status of the portable device 30 with the SIP infrastructure network, for example "Registered". When initiating the voice call, the touch screen 58 also displays the current action 62 that the portable device 30 is executing, i.e. "Calling", the identity of the user being called 64 and the device with the vicinity of the initiating user 66 that the initiating user has selected to use to participate in the voice communication session. The touch screen 58 can also display additional information 68 including a clock, pull down menus and the current function assigned to the input buttons 56.

Figure 4:
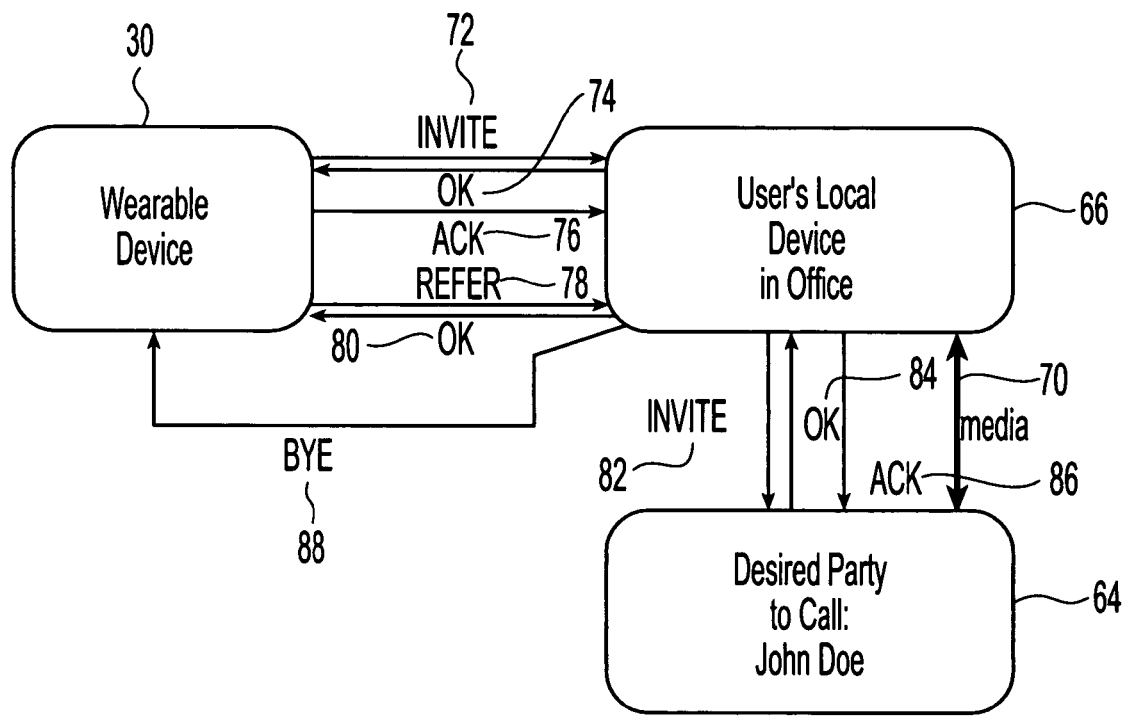
FIG. 4 is a schematic representation of an embodiment of the initiation of a voice call between two phones using a portable control device.

The call initiation steps performed by the portable device 30 are illustrated in FIG. 4. Initially, the portable device 30 establishes a connection with the initiating user's device 66, for example a wireline office phone. In one embodiment, the connection is established by first sending a SIP INVITE message 72 from the portable device 30 to the initiating user's device 66. The initiating user's device 66 responds with a SIP OK message to which the portable device 30 responds with a SIP ACK message. In this embodiment, the portable device 30 does not send RTP packets to its local device 66. Instead, the portable device 30 initiates a call transfer by logically sending a SIP REFER message 78 to its local device 66. The REFER message contains the SIP URI of the called party 64. The user's local device 66 responds to the REFER message with a SIP OK message 80.

The REFER message 78 causes the user's local device, i.e. the initiating user's office phone, to establish a voice communication session with the called party 64 associated with the embedded URI. In order to establish the voice communication session the user's local device 66 sends an INVITE message 82 to the desired party 64, which responds with an OK message 84 followed by an ACK message 86 from the user's local device 66. Based upon this message exchange, a media path 70 is established between the user's local device 66 and the called party 64, and the media exchange is commenced. The net effect of the control exchange in accordance with this embodiment is that the voice communication session is initiated from the portable device 30. The initiating user's local device 66 rings, and when the initiating user picks up this phone, the destination party 64 is called. When the party to be called picks up the phone, the media flows between the office phone 66 and the called party 64. At this point, the portable control device can be taken out of the control loop, for example by sending a SIP BYE message from the user's local device 66 to the portable device 30.

Additional software applications contained on the portable device 30 can be used to enhance the ability of the portable device 30 to initiate communication sessions. In one embodiment, a calendar application on the portable device 30 is used to initiate multi-party conference calls. The calendar logs the date and time of the conference call, a list of the SIP URI's for all of the conference call participants and any password information. The portable device 30 dials into a multi-party conference and provides the right password at the prescribed time. The portable device 30 also identifies an end-user device to initiate the call as was described above for the two-party phone call. This embodiment provides the benefits of eliminating the need to review a calendar application on another computer to determine the necessary information to create the phone conference, starting conference calls on time and reducing the frequency of misdialing.

In another embodiment, the portable device 30 responds to incoming calls and controls the actions taken in response to these incoming calls. Initially, the portable device 30 is registered with the SIP infrastructure and is identified as the current destination for incoming phone calls for one or more user agents 12 in the SIP infrastructure 10. The user agent associated with the portable control device registers with at least one SIP proxy server and is associated with a SIP URI and an associated PSTN number for non-SIP users to call. There are two modes of possible operation. In one embodiment, the portable device 30 contact number or contact address, i.e. the SIP URI or PSTN phone number associated with the portable device 30 itself, is advertised to other users. In another embodiment, the contact addresses or phone numbers of other devices are advertised to other users, and calls intended to those users are forwarded to the portable device 30. For example, a cellular phone can be used as the advertised contact point, and the cellular phone is augmented with a SIP user agent that automatically transfers all incoming calls to the portable device 30, either directly because there is a direct Bluetooth link between the cellular phone and the portable device 30 or through an intervening network containing the mobile operator and a SIP/PBX gateway.

Figure 5:
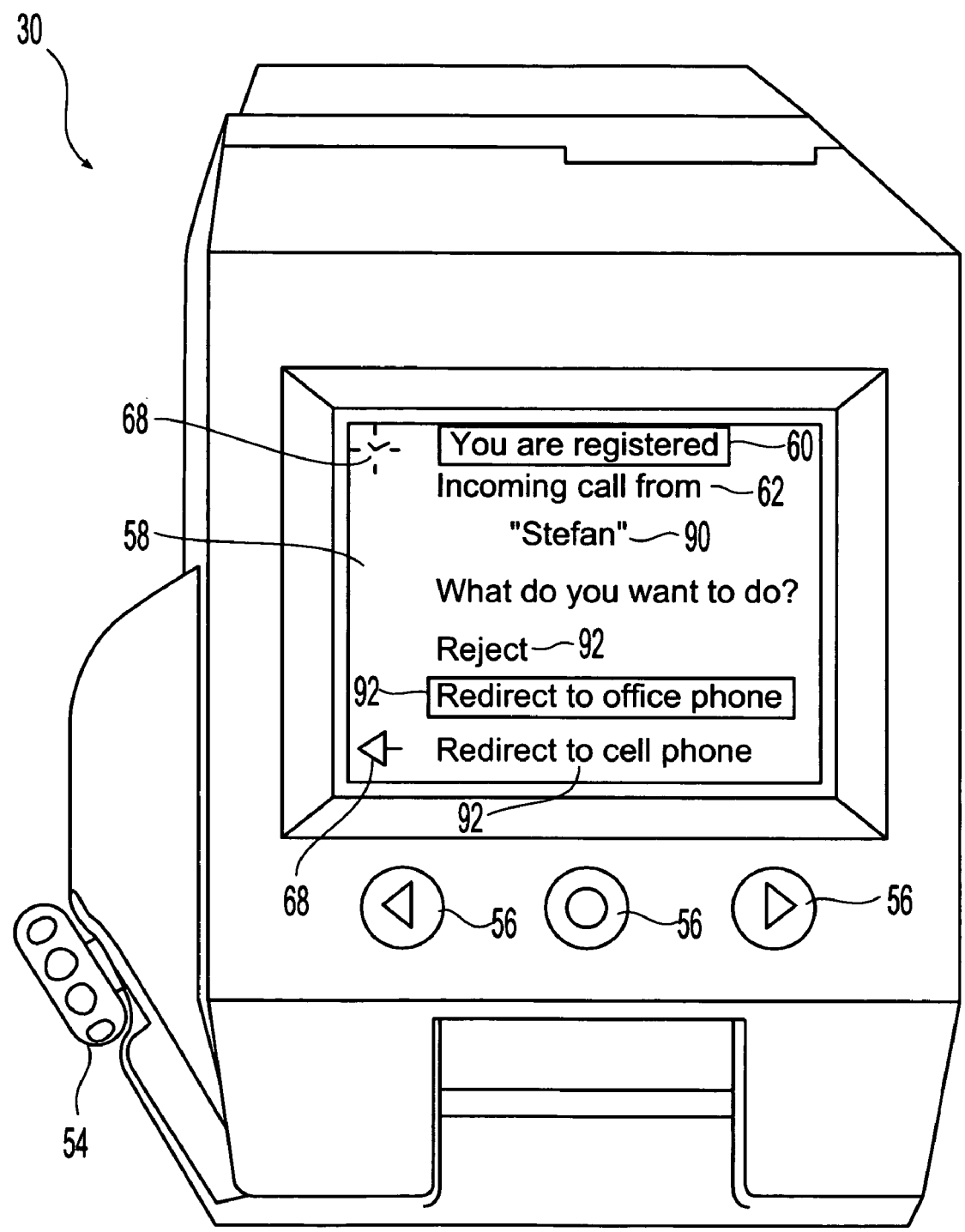
FIG. 5 is a plan view of a portable control device illustrating the receipt of an incoming voice communication session.

When a call is placed to the advertised phone number or contact address, the portable device 30 is notified, and the portable device 30 issues a pre-determined tactile or audible response. Since the portable device 30 is in direct contact with the user, this response, for example a beep or vibration, quickly and reliably obtains the attention of the user. As is shown in FIG. 5, the touch screen display 58 of the portable device 30 displays information relevant to the incoming phone call and to potential options in response to the incoming phone call.

The user then looks at the portable device 30 and is presented with this information or details related to the incoming call and a list of options for responding to the call. This information includes an indication that the current action is an incoming call 62, the identity of the calling party 90 and a menu containing a plurality of pre-configured action items 92 that present the user with a variety of responses to the incoming call. In one embodiment, the pre-configured action items 92 can be customized by the user. Suitable responses include redirecting the incoming call to one of a number of pre-defined end-user devices, i.e. a cell phone or an administrative assistant's phone, rejecting the incoming call using a busy signal and redirecting the call to a voicemail server either with or without an accompanying recorded message. These responses can all be displayed on the touch screen display 58 at the same time, or the user can scroll through a list containing these responses.

The system and method of the present invention provide the benefit of increasing the variety of actions that a user can choose in response to an incoming phone call beyond simply answering the call or ignoring the call as is currently done with cellular phones. The user rolls the stem switch 54 to highlight for selection the desired action from the list of potential actions. Depending on the selection, the underlying SIP user agent generates a response message and any appropriate status code. If for example the user selects the action "reject", the response message will be a "603 Decline". This response message can be displayed as the current action 62 on the portable device 30 and if desired can also be displayed on the device associated with the user originating the phone call.

Figure 6:
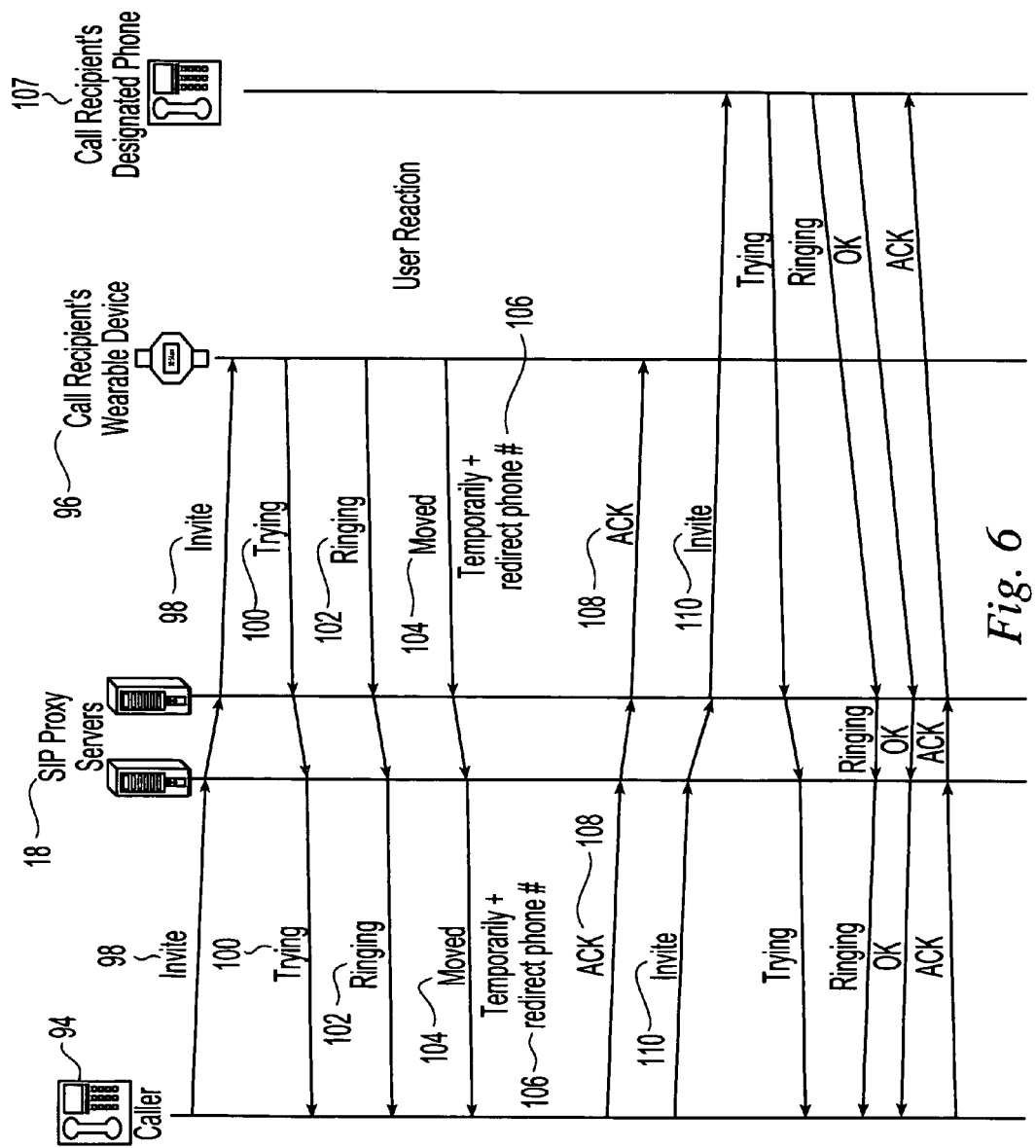
FIG. 6 is a chart illustrating an embodiment of a method for transferring a voice communication session from a portable device to a wireline phone.

A call flow diagram illustrating the use of the portable device 30 to accept an incoming phone call is illustrated in FIG. 6. In the embodiment illustrated, the phone number associated with the portable device 30 itself is advertised to the other users. A caller 94, via a user device such as an IP phone or PSTN phone, dials the number associated with the call recipient's portable device 96. A SIP INVITE 98 message is routed through the SIP proxy servers 18 to the call recipient's portable device 96. A SIP TRYING message 100 and a RINGING notification 102 are returned to the caller 94 through the SIP proxy servers 18. Since the chosen disposition of the incoming phone call is to accept the call using the call recipient's designated phone 107, a SIP MOVED TEMPORARILY response is generated and routed to the caller 94. This response also includes a SIP URI or redirect phone number 106 associated with the designated phone 107. The caller 94 uses a SIP ACK message 108 to acknowledge the redirection, and retries the call set-up using the redirect phone number 106 to send a SIP INVITE message 110 to the designated phone 107. SIP messages including TRYING, RINGING, OK and ACK can be exchanged to establish a voice communication session between the caller 94 and the designated phone 107.

In the previous embodiments, the portable device 30 relinquished control of the data exchange session once the session was established and the media flow between the two user devices was established. In another embodiment, the portable device 30 maintains control for the duration of the data exchange session. In this embodiment, the portable device 30 can be used to modify an existing communication session. For example, the portable device 30 can initially establish a voice call between the initiating user's office phone and the phone of another user. If during the voice call, the initiating user needs to travel to an appointment outside of the office, the initiating user's office phone connection is transferred to the initiating user's cellular phone, in order for the call to avoid termination. The portable device 30 facilitates this transfer without interrupting the existing voice call. In one embodiment, a SIP Back2Back User Agent (B2BUA) is used to facilitate the transfer of an ongoing media exchange session from a first user device to a second or alternate user device. A description of B2BUA can be found in J. Rosenberg et al., *SIP: Session Initiation Protocol*, RFC 3261. IETF, June 2002.

Figure 7:
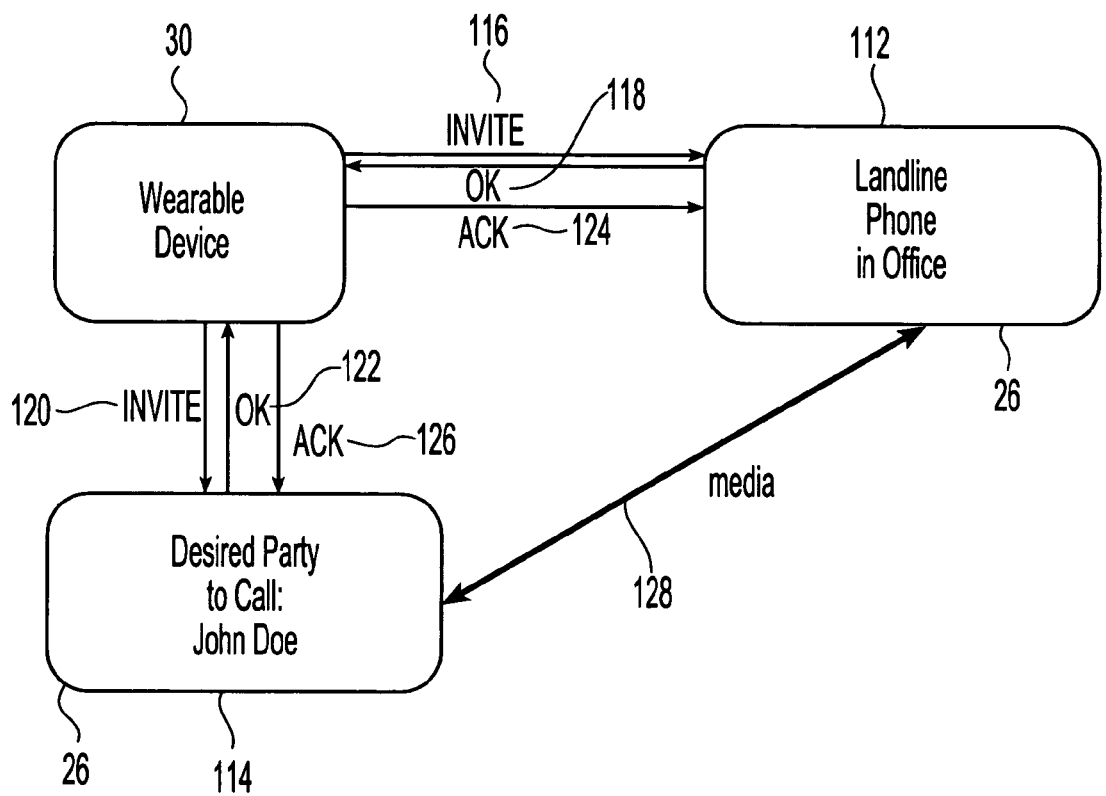
FIG. 7 is a schematic representation of another embodiment of the initiation of a voice call between two phones using a portable control device.

An embodiment of an initiation between two wireline phones where the portable device 30 maintains control of the session is illustrated in FIG. 7. As illustrated, the portable device 30 initiates the communication session by sending an INVITE message 116 to the user's wireline PSTN phone 112 and receiving an OK message 118 in response. Although the portable device 30 receives an IP address and port number from the phone 112 in order to establish the necessary media exchange path 128, an ACK message is not exchanged. The portable device 30 then forwards the IP address and port number to the wireline phone of the desired party 114 by sending an INVITE message 120, receiving an OK message 122 and sending an ACK message 126. In addition, the portable device 30 receives the IP address and port number of the called party 114. At this point, the portable device 30 sends an ACK message 124 to the user's wireline device 112 containing the called party's IP address and port number. Therefore, the media path 128 is established, and media is exchanged directly between the user's wireline phone 112 and the called party's wireline phone 114. However, signaling or control information continues to be routed through the portable device 30.

Figure 8:
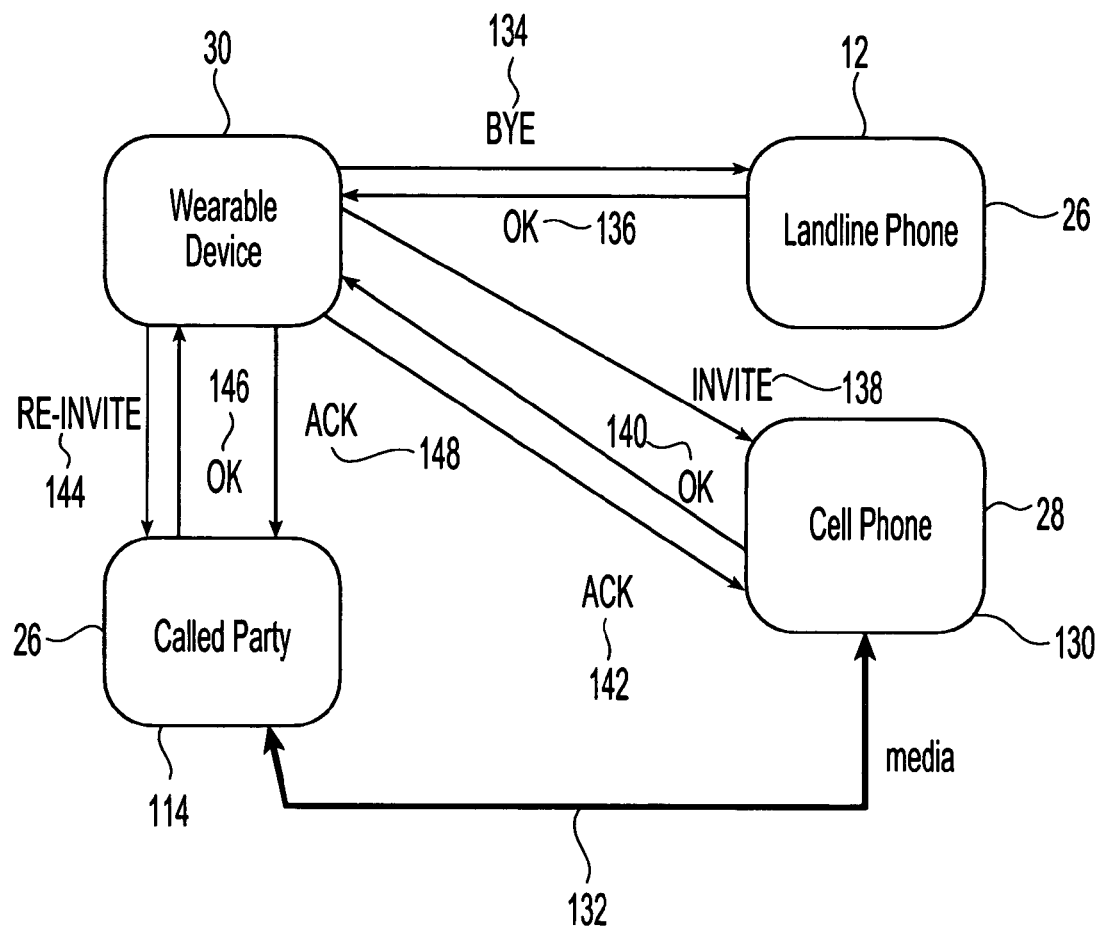
FIG. 8 is a schematic representation of a transfer of a voice call from a wireline phone to a wireless phone using a portable control device.

An embodiment of the transfer of a voice communication session from a wireline phone device to a cellular phone device is illustrated in FIG. 8. After a determination is made that the current voice communication session needs to be continued but that the voice call needs to be transferred from the wireline device and to the cellular device, the portable device 30 breaks the current voice communication leg to the user's wireline PSTN phone 112. In order to break the communication leg, the portable device 30 sends a BYE message 134 to the user's wireline device 112 and receives an OK message 136 from the wireline device 112 in response. The user's portable or wireless device 130 to which the voice communication session is to be transferred is identified, for example a cellular phone 28, and the portable device 30 contacts this wireless device 130 by sending an INVITE message 138 to which the wireless device 130 responds with an OK message 140. The wireless device 30 sends an ACK message 142. In order to inform the called party's device of the updated IP address and port number, the portable device 30 sends a RE-INVITE message 144 to the called party device 11, receives and OK message 146 and responds with an ACK message 148. Once the updated IP address and port number are provided to the called party device 114, an updated media path 132 is established between the called party device 114 and the initiator's wireless device 130 and the voice communication session continues.

Although these embodiments have been illustrated for voice communication sessions, the system and methods of the present invention can be used for any type of media exchange communication session including audio, video, text and combinations thereof. In fact, SIP is independent of the type of media exchanged once a communication session is established. SDP is used to inform the session endpoint devices about the type of media to be exchanged, which is opaque to the SIP signaling. Thus, the methods described above for establishing, controlling, transferring and terminating voice communication sessions can also be used for video sessions, text sessions and sessions containing mixed media. For example, the portable device 30 can initiate a video communication session between two laptop computers. Alternatively, the portable device 30 can initiate a video session between two laptop computers and then switch the session to a portable device 30 with video capabilities when one of the participants has to move. Invitations to join video conferences can also be sent to the portable device 30. The necessary information for joining the conference, i.e., IP addresses, etc., is sent to the portable device 30 directly. The user can then connect to the video session using input mechanisms and options displayed on the portable device 30.

In one embodiment, the system and method of the present invention are used to establish and control the exchange of text messages between users. In another embodiment, the portable device 30 is used to transfer ongoing IM sessions from one device to another, for example from the portable device 30 to a personal computer. IM is an increasingly popular method of communicating across a network. In fact, in corporate settings IM has sped up the communication process significantly and is preferred over E-mail for quick message exchanges. Recent extensions to the SIP protocol facilitate IM functionality. Since the SIP stack is already provided on the portable device 30 for video and audio sessions the methods and systems of the present invention can support the control of IM sessions using the portable device 30.

The portable device 30 can be used to establish an IM session between two user devices, to modify an existing IM session or to participate directly in an IM session with another user device. Since the processing, input and display properties of a portable device 30 are limited, these limitations are taken into account when establishing an IM session between a portable device 30 and another user device. In one embodiment, the OpenSIP stack on the portable device 30 is constructed to exchange messages with the NIST SIP Instant Messaging client and presence server. Details of the NIST SIP Instant Messaging client and presence server can be found at the National Institute for Standards and Technology, http://snad.ncsl.nist.gov. Construction of the SIP stack for IM includes extending the stack to handle incoming SIP SUBSCRIBE messages and to send SIP NOTIFY messages with presence information, i.e. common profile for instant messaging (CPIM) and presence information data format (PIDF), content in the body of the message. A discussion of CPIM-PDIF can be found in H. Sugano et al., *Presence Information Data Format*, draft-ietf-impp-cpim-pidf-08.txt. Internet Draft, IETF May 2003, which is incorporated herein by reference in its entirety. The portable device 30 registers as an IM device with a presence server and peer client. In addition, the SIP application includes a messaging client, and the user agent library includes functionality such as support for the SIP MESSAGE method. MESSAGE is used for transporting instant messages in the SIMPLE model.

When an IM is received by the portable device 30, the portable device 30 switches into instant messaging mode and relevant information, for example the sender's name, address and a text message, are displayed. In order to compensate for the constrained input, output and display capacity of the portable device 30, a plurality of pre-defined replies, including "yes", "no", and emotion icons, are programmed into the portable device 30 and can be selected using the input mechanisms of the portable device 30. In an embodiment were the portable device 30 is the Watchpad®, simple 'yes' and 'no' replies are sent by pressing either the left or right buttons, and the middle button is set to allow the selection of a reply from a list of pre-defined replies or emotion icons.

The available capacity of the portable device 30 to respond to messages is communicated to the other IM participant. In one embodiment, the participant is notified to keep the messages relatively brief and to phrase questions in yes and no answer format or in ways that are suitable for the pre-defined replies. In addition, the presence mechanism on IM systems can add another state indicating that the user is available but is using a portable device 30 with limited capabilities.

Figure 9:
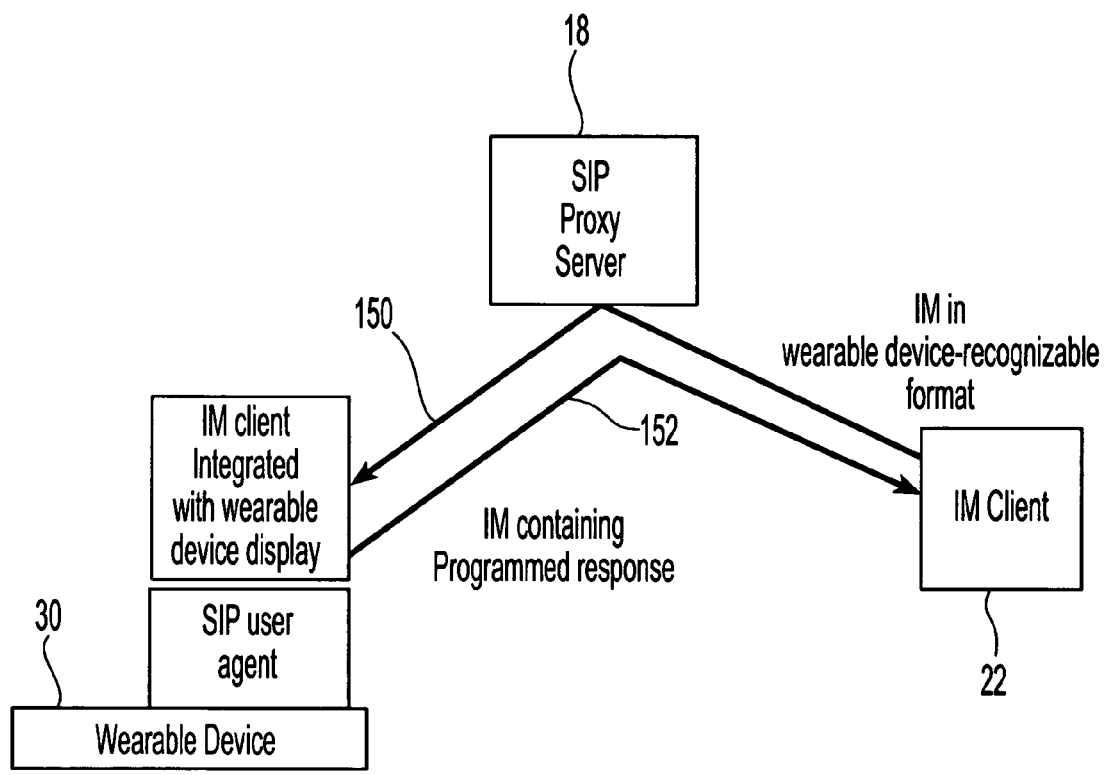
FIG. 9 is a schematic representation of an instant messaging session between a personal computer and a portable control device in accordance with the present invention.

An embodiment in accordance with the present invention where a portable device 30 participates in an IM session with another user device, in this case a personal computer 22, is illustrated in FIG. 9. Both the portable device 30 and the personal computer 22 register with the SIP proxy server 18 as available IM clients. The portable device 30 in particular, notifies the SIP proxy server 18 that it is a portable device 30 with constrained resources for IM sessions. Notification is provided to the user at the personal computer of the formatting constraints of the user connected with the portable device 30. This notification can be provided using icons on the personal computer, changing the appearance or color of the text associated with the portable device 30 user or sending an explicit message to the personal computer user. This notification can be provided at the time the portable device 30 registers with the proxy server or when the personal computer user attempts to send a message to the portable device 30. The computer device user 22 constructs an IM in accordance with the formatting specifications and sends a message 150 to the portable device 30. The portable device 30 responds to the message 152 by sending one or more of the pre-defined responses to the personal computer user.

The use of the portable device 30 as a participant in an IM session is consistent with the separation of control and media exchange functions in accordance with the present invention. As currently configured and implemented, for example using the SIMPLE model, the payload of an IM is carried as a signaling message, i.e., the "control" message itself carries the "media" which is the IM payload in this case. A similar combination of the media and control messages is utilized in a SIP-based publish-subscribe system. Therefore, in another embodiment, the portable device 30 can receive the subscription information in publish-subscribe systems. In this embodiment, the portable device 30 is used to receive immediate notification when certain events in which the user has expressed an interest become true.

In one embodiment were the portable device 30 provides a subscription service to a publish-subscribe system, SIP provides built-in pub/sub functionality through its SUBSCRIBE and NOTIFY methods. This functionality is used in SIMPLE for a client to subscribe to another user's current presence status and willingness to exchange messages. The functionality of pub/sub can be applied to other areas as well, such as for example periodic retrieval of personalized information such as weather conditions or forecasts or updates on stock prices.

The portable device 30 provides for user-display of the desired pub-sub information. In one embodiment, each subscription to a service can be represented on the portable device's screen as a distinctive icon. A change in the parameters or values associated with the subscribe service can be visually indicated in the screen, e.g. by using a change in the icon. In one example, a weather service can be represented by sun, rain, or snow icons, and the current icon displayed provides an immediate indication of the current weather conditions.

The ability of the portable devices to receive IM's and other types of notifications can be coupled with enterprise workflow systems, such as the processing of travel expenses within a department. The processing of travel expenses typically requires approval from managers as well as other human resources personnel. When an exception is encountered during processing, a notification, typically an E-mail, is sent to the originator of the workflow asking for clarification. Depending on how quickly the originator responds to the E-mail, delays in the workflow will result. These delays are alleviated if the SIP URI of the originator's portable device 30 is registered with the workflow system and an IM is sent to the portable device 30 when an exception is encountered. This IM will contain a set of preconfigured responses particularly tailored to the situation, which permit the originator to respond quickly to the exception, reducing the processing times associated with enterprise workflow systems. In other embodiments, the use of the portable device 30 is applied to orchestrating sensor data traffic to data composition and analysis engines.

In another embodiment, the portable device 30 controls the operation of other devices by controlling the media delivery to these devices. For example the portable device 30 can control volume or sound quality settings on a media device by sending commands marked up in extensible markup language (XML). Other examples include providing functionality that is typically found in a video tape player, i.e. pause, rewind, stop, fast forward, etc. This functionality can be achieved by enhancing the recently proposed message session relay protocol (MSRP), which is designed for session-based instant messaging. A discussion of this protocol can be found at B. Campbell et al., *The Message Session Relay Protocol*, SIMPLE Working Group Internet-Draft, January 2004, which is incorporated herein by reference in its entirety. Unlike SIMPLE, the user devices or endpoints establish the communication session and exchange media, i.e. messages, between the endpoints on the media path. These messages can represent commands and responses between the endpoints as long as the command set of the controlled device is made known to the controller. This could, for example, be done by initially sending a message that contains a list of commands and explanations, perhaps with XML schemas, of their intended usage which can be displayed on the controller's screen. By appropriate use of tags in this message, the text that represents commands can be highlighted and made selectable.

In one embodiment, the portable device 30 is provided with various identification and authentication mechanisms. For example, the portable device 30 can include a fingerprint sensor to authenticate users. Therefore, in one embodiment, the portable device 30 conducts user verification before initiating a communication session or before releasing any control information or passwords necessary for SIP device registration and call establishment. Therefore, system misuse resulting from a lost or stolen portable device 30 can be prevented.

Portable control devices can expand the power of SIP significantly and provide a better user experience. Portable devices can be used quite effectively to initiate communication sessions through multiple media and switch between two end devices when required. Portable devices also present a very convenient interface for determining the originator of media streams directed towards the user. The user can then decide not only whether to pick up the media stream but also where to play the stream. Since energy conservation is an important issue in mobile device technology, the present invention by transferring communication sessions to stationary devices when possible even if mobile devices are capable of playing the media allows the mobile devices to conserve energy for handling the control portions.

EXAMPLES

An example of a subscription and publication service using a portable device 30 was prototyped using a weather information subscription package that requests regular updates from an information server. For purposes of this example, whenever the current weather conditions deviate from the last update period by a specified quantity, the subscription server sends an update notification to the portable device 30. The publication/subscription mechanism of SIP eliminates the need for having to continuously or regularly poll the server for updates. Updates are automatically sent in accordance with the pre-defined parameters, and the frequency of these updates is a function of the rate at which the weather conditions change and the chosen parameters for triggering notification.

The subscription package for receiving weather updates is illustrated below. The subscription package is sent in the body of a SUBSCRIBE message where the "Event" header line indicates "weather". The updates section of the XML document defines at what deviation the client wants to receive updates. In this case updates are requested for every degree Celsius, for every 30 degrees change in wind-direction and for any change in weather condition (currently not provided by the server).

```
<?xml version="1.0" encoding="UTF-8"?>
<weather xmlns="xyz:ns:weather">
    <subscription>
        <location>
            <country>US</country>
            <zip>98765</zip>
        </location>
        <temperature>1</temperature>
        <winddir>30</winddir>
        <condition>*</condition>
    <subscription>
</weather>
```

To retrieve real-world information, the server queries a public web service every 10 minutes for weather information, temperature only as illustrated, and then notifies all interested parties.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for conducting a media exchange session between a first user and one or more second users, the method comprising:

separating a control portion comprising initiation, configuration and modification of the media exchange session from a media exchange portion of the media exchange session comprising exchange of at least one of audio, video and text media;

identifying a portable control device located proximate the first user to handle the control portion of the media exchange session, the portable control device configured to participate in the control portion of the media exchange session only without participating in the media exchange portion, the portable control device comprising a wrist watch;

using the portable control device in the control portion to initiate the media exchange session by using the portable control device to identify a first media device separate from the portable control device and located proximate the first user, to establish a connection with the first media device, to identify a second media device separate from the portable control device and located proximate one of the second users and to communicate the identity of the second media device to the first media device;

using the first media device to contact the identified second media device to establish a media exchange path between the first device and the second device; and using the first media device and the second media device to participate in the media exchange portion to exchange media between the first user and one of the second users.

2. The method of claim 1, wherein the step of using the portable control device in the control portion comprises using session initial protocol to control the media exchange session.

3. The method of claim 1, wherein the first media device is capable of sending, receiving and displaying media exchanged during the media exchange session; and the second media device is capable of sending, receiving and displaying the media exchanged during the media exchange session.

4. The method of claim 3, wherein the step of using the portable control device in the control portion further comprises:

maintaining control of the media exchange session with the portable control device;

identifying an alternate media device located proximate the first user, the alternate media device capable of sending, receiving and displaying the media exchange during the media exchange session; and transferring the media exchange path from the first media device to the alternate media device.

5. The method of claim 1, wherein the step of using the portable control device in the control portion comprises:

establishing control over the media exchange session by the portable control device, the media exchange session comprising the media exchange path between the first media device located proximate the first user and the second media device located proximate the second user, the first and second media devices separate from the portable control device;

using the portable control device to identify an alternate media device located proximate the first user, the alternate media device capable of sending, receiving and displaying the media exchanged during the media exchange session; and using the portable control device to transfer the media exchange path from the first media device to the alternate media device.

6. The method of claim 5, wherein the step of identifying the alternate media device comprises identifying a portable media device.

7. The method of claim 1, further comprising:

receiving an invitation on the portable control device from the second user to join the media exchange session; and processing the invitation by selecting one of a plurality of pre-defined action items stored and displayed on the portable control device.

8. The method of claim 7, wherein the pre-defined action items comprise identifying a device proximate the first user to participate in the media exchange session, holding the invitation for a specified period of time or transferring the invitation to another device.

9. The method of claim 7, wherein the media exchange session comprises an interactive text messaging exchange and the step of processing the invitation comprises:

selecting a pre-defined action for joining the interactive text messaging exchange;
using the portable control device as the first media device to exchange text messages; and
exchanging the text messages between the first media device and the second media device located proximate the second user.

10. A non-transitory computer readable medium containing a computer executable code that when read by a computer causes the computer to perform a method for conducting a media exchange session between a first user and one or more second users, the method comprising:
separating a control portion comprising initiation, configuration and modification of the media exchange session from a media exchange portion of the media exchange session comprising exchange of at least one of audio, video and text media;
identifying a portable control device located proximate the first user to handle the control portion of the media exchange session, the portable control device configured to participate in the control portion of the media exchange session only without participating in the media exchange portion, the portable control device comprising a wrist watch;
using the portable control device in the control portion to initiate the media exchange session by using the portable control device to identify a first media device separate from the portable control device and located proximate the first user, to establish a connection with the first media device, to identify a second media device separate from the portable control device and located proximate one of the second users and to communicate the identity of the second media device to the first media device;
using the first media device to contact the identified second media device to establish a media exchange path between the first device and the second device; and
using the first media device and the second media device to participate in the media exchange portion to exchange media between the first user and one of the second users.

11. The non-transitory computer readable medium of claim 10, wherein the step of using the portable control device in the control portion comprises using session initial protocol to control the media exchange session.

12. The non-transitory computer readable medium of claim 10, wherein the first media device is capable of sending, receiving and displaying media exchanged during the media exchange session; and
the second media device is capable of sending, receiving and displaying the media exchanged during the media exchange session.

13. The non-transitory computer readable medium of claim 12, wherein the step of using the portable control device in the control portion further comprises:
maintaining control of the media exchange session with the portable control device;
identifying an alternate media device located proximate the first user, the alternate media device capable of sending, receiving and displaying the media exchange during the media exchange session; and
transferring the media exchange path from the first media device to the alternate media device.

14. The non-transitory computer readable medium of claim 10, wherein the step of using the portable control device in the control portion comprises:
establishing control over the media exchange session by the portable control device, the media exchange session comprising the media exchange path between the first media device located proximate the first user and the second media device located proximate the second user, the first and second media devices separate from the portable control device;
using the portable control device to identify an alternate media device located proximate the first user, the alternate media device capable of sending, receiving and displaying the media exchanged during the media exchange session; and
using the portable control device to transfer the media exchange path from the first media device to the alternate media device.

15. The non-transitory computer readable medium of claim 10, further comprising:
receiving an invitation on the portable control device from the second user to join the media exchange session; and
processing the invitation by selecting one of a plurality of pre-defined action items stored and displayed on the portable control device.

16. The non-transitory computer readable medium of claim 15, wherein the media exchange session comprises an interactive text messaging exchange and the step of processing the invitation comprises:
selecting a pre-defined action for joining the interactive text messaging exchange;
using the portable control device as the first media device to exchange text messages; and
exchanging the text messages between the first media device and the second media device located proximate the second user.

17. A system for use in conducting a media exchange session between a first user and one or more second users, the system comprising:
a portable control device comprising a wrist watch disposed at the first user and a portable control device user agent allocated to only a control portion of the media exchange session comprising initiation, set-up and modification of the media exchange session;
a first media device disposed proximate the first user and capable of sending, receiving and displaying media exchanged during the media exchange session the first media device comprising a first media device user agent allocated to only a media exchange portion of the media exchange session;
a second media device disposed proximate the second user and capable of sending, receiving and displaying the media exchanged during the media exchange session the second media device comprising a second media device user agent allocated to only the media exchange portion, the first and second media devices and user agents separate and distinct from the portable control device and user agent;
a media exchange path between the first media device and the second media device for sending media between the first and second media devices, the portable control device not an endpoint in the media exchange path; and
at least one proxy server in communication with the portable control device, the first media device and the second media device separate from the portable control device, the proxy server capable of facilitating control of the media exchange session.

18. The system of claim 17, wherein the proxy server is a session initiation protocol proxy server and the portable control device user agent, first media device user agent and second media device user agent are session initiation protocol based user agents.

* * * * *